United States Patent [19]

Broucksou

[11] Patent Number: 4,840,244

[45] Date of Patent: Jun. 20, 1989

[54] AUTOMATIC REGULATOR VALVE ASSEMBLY FOR VEHICLE POWER STEERING

[75] Inventor: Robert H. Broucksou, Hanover, Pa.

[73] Assignee: R.H. Sheppard Co., Hanover, Pa.

[21] Appl. No.: 138,046

[22] Filed: Dec. 28, 1987

[51] Int. Cl.⁴ .............................................. B62D 5/08
[52] U.S. Cl. .................... 180/143; 137/115;
   417/307; 417/310
[58] Field of Search ............... 180/143, 141, 142, 132;
   417/310, 307; 137/115

[56] References Cited

U.S. PATENT DOCUMENTS

| | | | |
|---|---|---|---|
| 3,367,354 | 2/1968 | Gallant | 137/115 |
| 3,693,747 | 9/1972 | Nishikawa | 180/143 |
| 4,274,504 | 6/1981 | Kawabata et al. | 180/143 |
| 4,311,161 | 1/1982 | Narumi et al. | 180/143 |
| 4,434,866 | 3/1984 | Duffy | 180/143 |
| 4,485,883 | 12/1984 | Duffy | 180/142 |
| 4,600,071 | 7/1986 | Kitahara et al. | 180/132 |

*Primary Examiner*—John A. Pekar
*Attorney, Agent, or Firm*—King & Schickli

[57] ABSTRACT

An automatic regulator valve assembly is provided to vary fluid flow to a power steering gear in response to steering gear hydraulic pressure in order to provide optimum road feel, as well as optimum power assist throughout the range of vehicle operating conditions. The valve assembly divides the fluid flow between the steering gear and a bypass line that directs any excess fluid back to the fluid reservoir. A flow control valve in the valve assembly supplies the fluid to the steering gear, and a shuttle valve working in concert with the flow control valve serves to bypass the excess fluid. The flow control valve supplies fluid to the steering gear according to the demands of the gear itself. During low speed, high demand operation, operator steering inputs are large, requiring maximum fluid flow for optimum power assist. As vehicle speed increases and demand decreases, steering inputs decrease proportionally. As steering inputs decrease, fluid flow requirements also decrease. Accordingly, the flow control valve supplies less fluid to the steering gear, allowing more fluid to bypass to the reservoir.

23 Claims, 3 Drawing Sheets

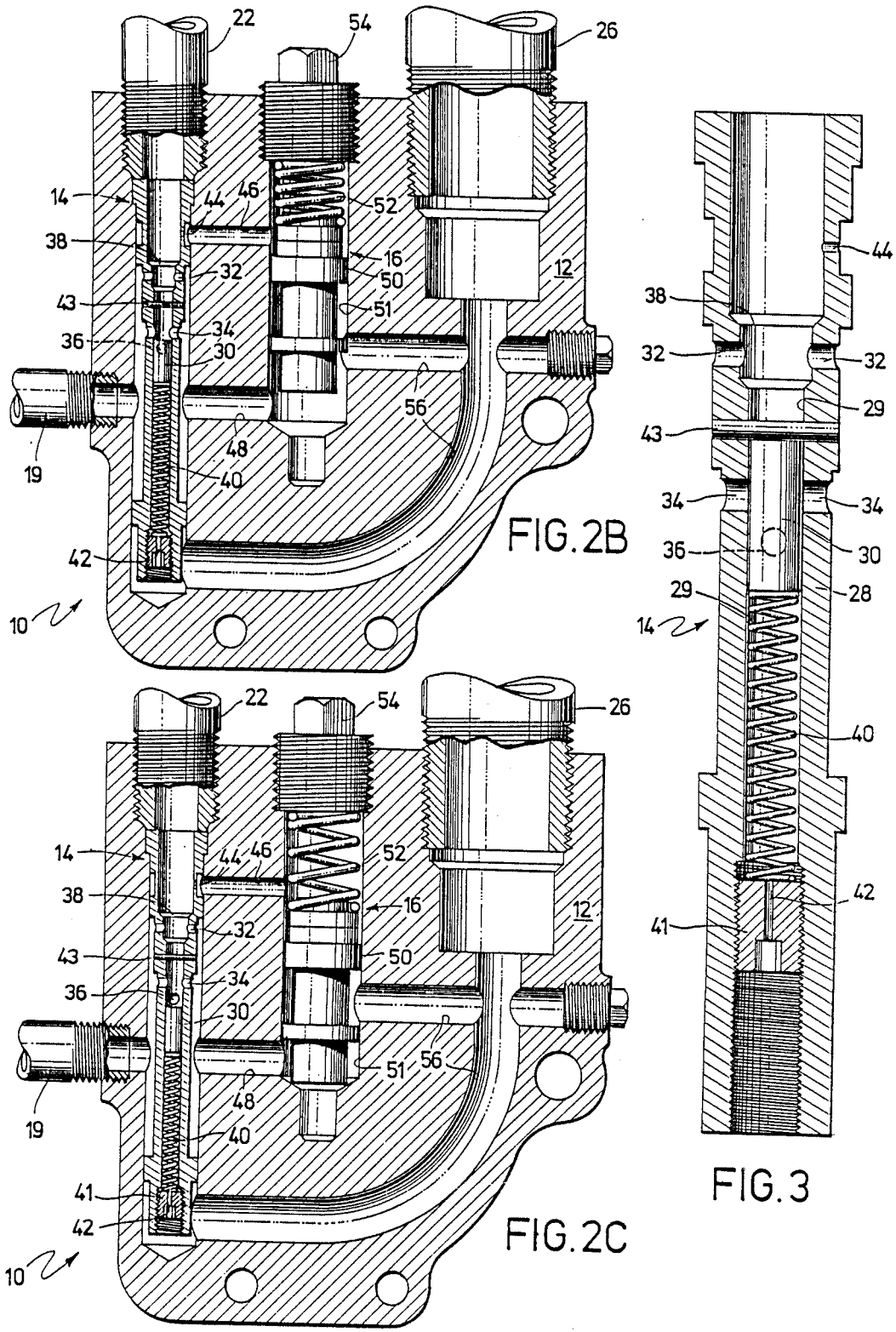

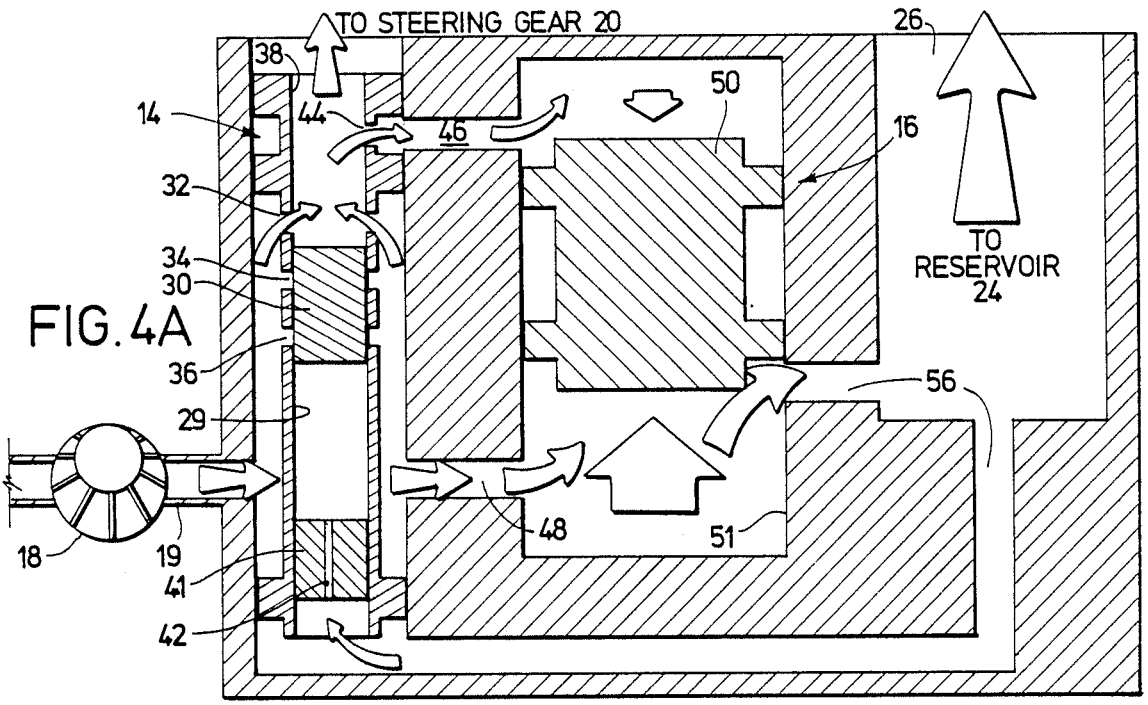
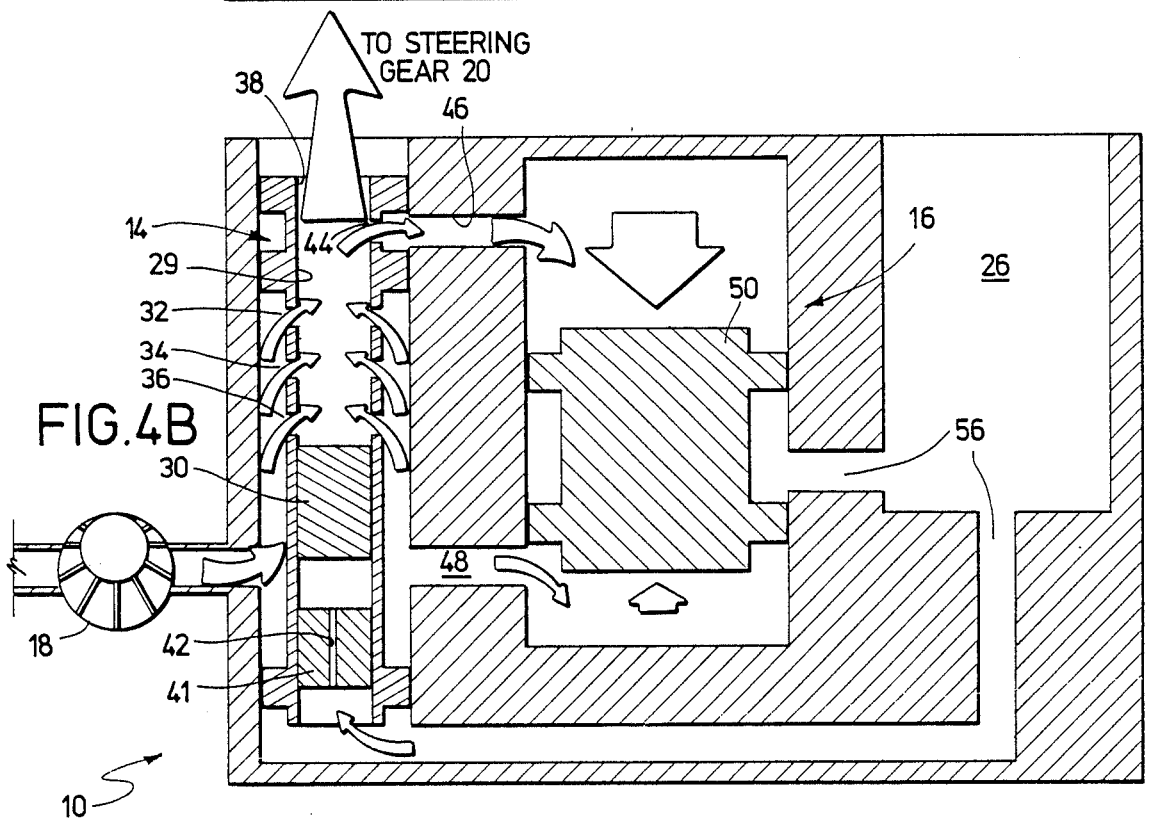

AUTOMATIC REGULATOR VALVE ASSEMBLY FOR VEHICLE POWER STEERING

TECHNICAL FIELD

The present invention relates to vehicle power steering systems, and more particularly, to a vehicle power steering system including an automatic regulator valve assembly providing variable fluid flow in response to vehicle operating conditions.

BACKGROUND OF THE INVENTION

The advantages of providing power assisted steering units in vehicles are well known. Most automobiles and trucks on the market today include power steering units as a convenience to the operator. As vehicle size increases, the necessity for power steering assist increases as well. Indeed, some of the larger trucks on the road today must be equipped with power steering units in order to make comfortable operation feasible with a normal size steering wheel.

Conventional power steering units provide essentially the same degree of assist under all operating conditions. This represents a compromise, because at low speeds and high steering inputs, a large degree of power assist is desirable, but at higher speeds and smaller steering inputs, this same high degree of assist is no longer required. Indeed, at highway speeds, most vehicles require very little power assist. The high level of assist provided by the conventional units at highway speeds results in an undesirable loss of road feel.

U.S. Pat. No. 3,693,747 to Nishikawa assigned to Honda discloses a control apparatus to reduce power assist in response to increasing vehicle speed. This system requires an input corresponding to vehicle speed which, in the embodiment disclosed, is a variable oil pressure signal from a motor driven governor.

Similarily, U.S. Pat. No. 4,434,866 to Duffy assigned to Ford Motor Company discloses a variable assist power steering system. This system provides lesser power assist at high speeds and increases the power assist as the vehicle speed decreases. Here again, this system requires a vehicle speed signal as an input to the system.

A need exists for a power steering system which supplies variable steering assist in response to vehicle speed/fluid input pressure variations, yet which does not require a separate vehicle speed input signal to operate. Such a system would provide optimum road feel characteristics and power steering assist and yet would be simpler and more economical to implement.

SUMMARY OF THE INVENTION

Accordingly, it is a primary object of the present invention to provide an automatic regulator valve assembly for flow control in a power steering system overcoming the limitations and disadvantages of the prior art.

Another object of the present invention is to provide an automatic regulator valve assembly providing variable levels of pressurized fluid flow to change the power steering assist in response to operating conditions.

Another object of the present invention is to provide an automatic regulator valve assembly which provides a high fluid flow level for power steering assist during low speed high demand operation, and lower levels of flow and power assist at higher speeds, lower demands.

Another object of the present invention is to provide an automatic regulator valve assembly which varies the fluid flow level available for power steering assist in response to vehicle operating conditions, thereby providing enhanced road feel characteristics at higher operating speeds.

Another object of the present invention is to provide an automatic regulator valve assembly providing increased operating efficiency by decreasing the power requirements of the power steering pump when maximum assist is not required.

Still another object of the present invention is to provide an automatic regulator valve assembly which is compact, economical and which can be made integral with the hydraulic pump or a separate component to be conveniently retrofitted to systems already in service.

Yet another object of the present invention is to provide a power steering system which provides a high level of assist during low speed, high demand operation and lower levels of assist during high speed, low demand operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an automatic regulator valve assembly delivers a variable flow of pressurized hydraulic fluid to a steering gear in response to the requirements of the gear. In operation, this system provides variable levels of power steering assist in response to vehicle operating conditions.

The preferred embodiment of the automatic regulator valve assembly selected to illustrate the invention includes a flow control valve and a shuttle valve. The flow control valve senses the inlet pressure to the vehicle's power steering gear and supplies pressurized hydraulic fluid from the power steering pump to the gear substantially in response to the demand of the gear. In other words, as the inlet pressure to the steering gear increases (large steering input), the flow control valve responds by supplying a greater flow of pressurized hydraulic fluid. This increased flow to the gear results in greater power assist.

Any excess fluid (fluid not required by the steering gear) is returned to the fluid reservoir via a bypass line. The shuttle valve works in concert with the flow control valve to bypass the excess fluid. The shuttle valve permits a bypass flow in direct proportion to a differential pressure sensed across the regulator valve.

In the preferred embodiment, three sets of opposed flow orifices are provided in the regulator valve to provide three levels of hydraulic fluid flow. The first set remains open at all times providing a minimum level of hydraulic fluid flow. The other two sets of flow orifices are sequentially uncovered by a regulator valve piston to provide more fluid flow to meet the demand. As system pressures increase, the piston is forced downwardly (away from the flow outlet) sequentially uncovering these orifices. Similarly, as system pressures decrease (steering inputs decrease) the piston cuts off the flow through the additional orifices.

In an important aspect of this invention, an orifice is provided to allow fluid pressure to be present on the underside of the piston. This creates a dampening column of fluid which works in conjunction with a spring to dampen piston movement. Advantageously, this results in smooth transition from one assist level to another, thereby providing desirable operating characteristics.

During operation, the valve assembly provides variable flow rates of pressurized hydraulic fluid directly in response to the requirements of the power steering gear. When the vehicle is being operated slowly, or is operated in adverse terrain such as mud, large steering wheel inputs are required in order to effect the desired change in vehicle direction. As the steering inputs increase, the fluid pressure at the steering gear inlet increases. The fluid pressure in the regulator valve correspondingly increases. This increased pressure forces the regulator valve piston downwardly. As the piston continues downward movement, an additional one or more sets of flow orifices are opened allowing more flow to compensate for the increased demand. Simultaneously, a control orifice pressure above the piston also increases. This increased fluid pressure serves to change the position of the spool in the shuttle valve, thereby reducing the flow of bypass fluid.

It should be emphasized that the automatic regulator valve assembly of the present invention works completely in response to steering gear inlet pressure. No other control system inputs are necessary as are required in the prior art. Accordingly, this invention is simpler and less complicated than the prior art control systems that rely on vehicle speed feedback information. Additionally, the automatic regulator valve assembly is self-contained, and therefore, can be built as a separate component and easily retrofitted into vehicle steering systems already placed in service.

In other embodiments of the present invention the regulator valve assembly may be made integral with the hydraulic pump or with the steering gear creating a more compact power steering system but which also efficiently responds to steering gear inlet pressure to produce optimum power assist.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and becoming a part of the specification, illustrates several aspects of the present invention and together with the description serves to explain the principles of the invention. In the drawings:

FIG. 2B is a cross-sectional view of the automatic regulator valve assembly showing the intermediate power assist/partial bypass mode of operation:

FIG. 2C is a cross-sectional view of the automatic regulator valve assembly showing the full power assist/no bypass operation mode of operation;

FIG. 3 is an enlarged cross-sectional view of the flow control valve which is included in the automatic regulator valve assembly of the present invention;

FIG. 4A is a schematic representation of fluid flow through the automatic regulator valve assembly in the minimum power assist/full bypass mode (compare to FIG. 2A); and FIG. 4B is a schematic representation of fluid flow through the automatic regulator valve assembly in the full power assist/no bypass mode (compare to FIG. 2C).

DETAILED DESCRIPTION OF THE INVENTION

Figure 1:
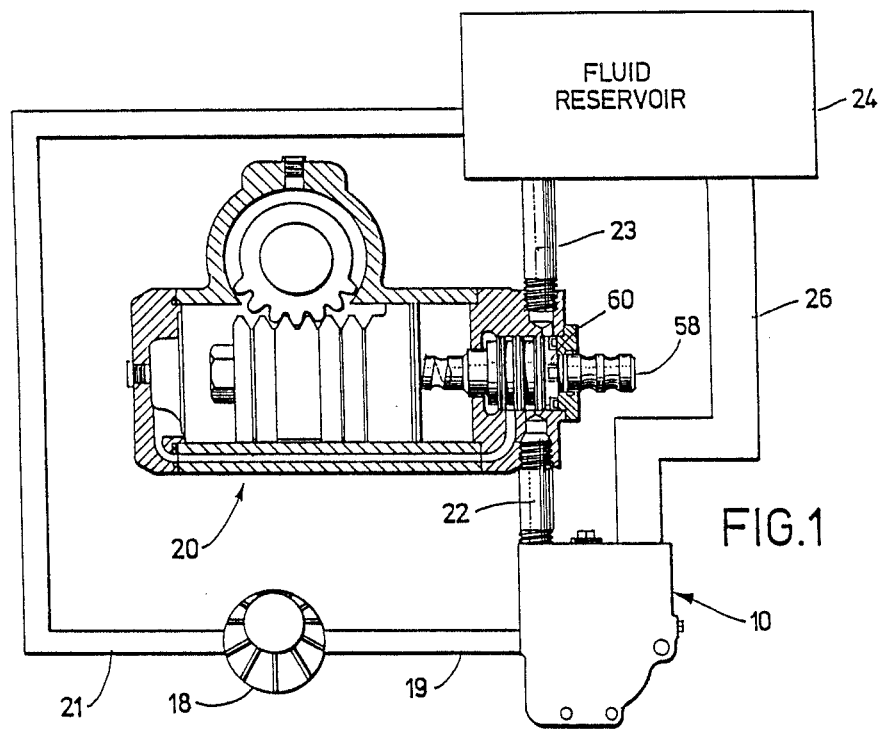
FIG. 1 is a schematic diagram of a power steering system incorporating an automatic regulator valve assembly of the present invention installed as a separate component of the system; the steering gear being shown in cutaway view to illustrate one type of steering gear that can be utilized in the system.

Reference is now made to the drawing figures showing the automatic regulator valve assembly for a vehicle power steering system. The regulator valve assembly provides a variable flow of hydraulic fluid to a power steering gear in response to the pressure demands to the gear itself. As will be described in more detail below, the regulator valve assembly divides the flow from the power steering pump between the power steering gear and a bypass leading to a fluid reservoir. Advantageously, this results in variable levels of power steering assist in response to vehicle operating conditions. This provides a desirable enhancement of road feel at higher vehicle speeds, and also results in increased vehicle efficiency because the power steering pump only produces maximum output (requiring maximum power input from the vehicle engine) when necessary.

The regulator valve assembly 10 includes a valve body 12 which contains various internal flow passages and two valves; a flow control valve 14 and a shuttle valve 16, which work in concert to divide the hydraulic fluid flow. High pressure hydraulic fluid from the power steering pump 18 is directed to the regulator valve assembly 10 through pump discharge line 19. The flow control valve 14 and the shuttle valve 16 cooperate to provide the necessary pressurized hydraulic fluid to the steering gear 20 and bypass the excess to the fluid reservoir 24. The fluid passing through the control valve 14 is regulated by a first set of opposed transverse orifices 32 (see FIG. 3), which flow provides the minimum power assist (see FIG. 4A and the proportional flow arrows). Low pressure supply line 21, power steering gear inlet line 22, return line 23 and fluid bypass line 26 are provided to direct the fluid flows respectively.

Figure 2A:
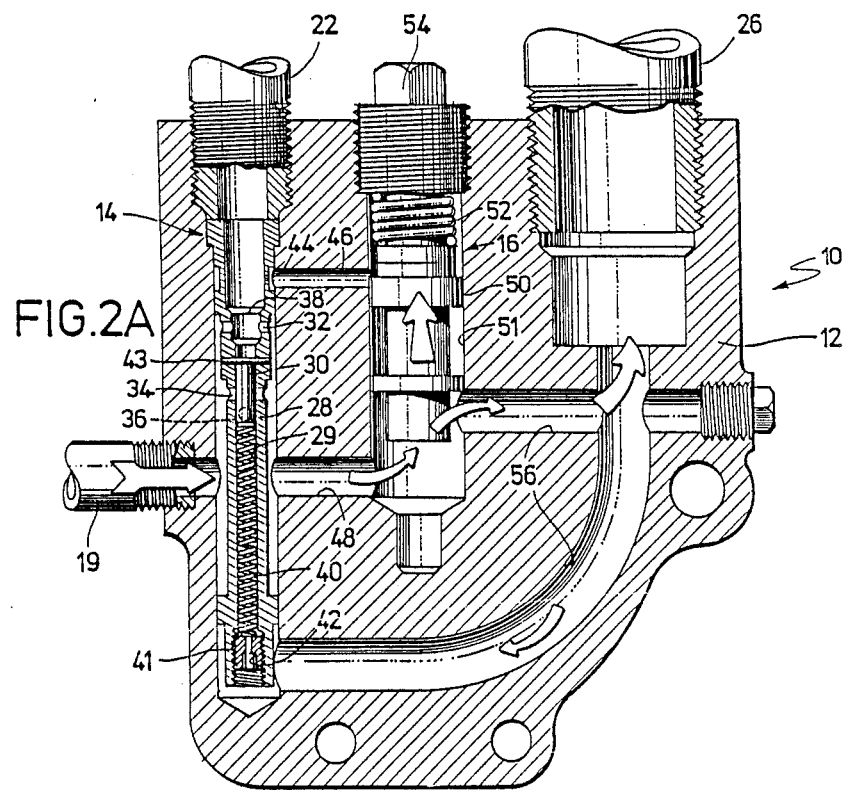
FIG. 2A is a cross-sectional view of the automatic regulator valve assembly showing the minimum power assist/full bypass mode of operation.

As best illustrated in FIGS. 2A–2C and FIG. 3, the flow control valve 14 includes an internal valve body 28. This valve body 28 includes a elongated concentric cylinder 29 passing axially therethrough. A reciprocating piston 30 is provided in the cylinder, and according to an important aspect of this invention, continuously regulates any increased flow of pressurized hydraulic fluid above the minimum supplied through orifices 32.

Piston 30 moves in its cylinder 29 in response to the inlet pressure to steering gear control valve 60. As operator steering input force to the steering gear 20 increases, the valve 60 inlet pressure increases correspondingly. Due to this increased pressure, the reciprocating piston 30 is forced downwardly within its cylinder 29; i.e. the piston 30 moves away from outlet orifice 38 of the valve 14 supplying fluid through line 22 to the gear 20. As the piston 30 travels within the cylinder 29, it sequentially opens a second and third set of opposed transverse flow orifices 34, 36 (see FIGS. 2C and 4B). As these orifices are uncovered, the flow increases in the cylinder 29, continues through outlet orifice 38 (see proportional flow arrows in FIG. 4B) and ultimately enters the steering gear 20 through the inlet line 22.

It should be emphasized that the number and size of these flow orifices can be varied to suit the steering gears of various manufacturers. In manufacturing a prototype for the extensive testing and development required, and now which is the preferred embodiment shown for purposes of illustrating the invention, a Sheppard M-100 steering gear and standard Vickers vane pump were used. In the preferred embodiment the following area relations have been found to provide the desired performance:

$$A_{38} > A_{32} + A_{34} + A_{36} \quad (1)$$

$$A_{34} + A_{36} = 2A_{32} \quad (2)$$

$$A_{34} + A_{36} \quad (3)$$

These proportions are found through test stand and on vehicle testing to give a consistent flow ratio that best suits matching the power requirements with demand and providing significant increased efficiency. The ratio of approximately 2:1 between the minimum and maximum power assist conditions, and a 1.5:1 ratio for the intermediate condition have proven to be an optimum design. The resulting fluid flows are 3, 4.5 and 6 gallons per minute.

The flow control valve 14 also includes a piston bias spring 40 which serves to dampen the movement of piston 30. This dampening action is further facilitated by the placement of a restricted bleed orifice 42 in the adjusting screw 41 for the spring. This orifice 42 allows bypass fluid pressure as found in internal bypass passage 56 and low pressure fluid leakage past piston 30, to accumulate underneath the piston 30. Advantageously, the resulting fluid dampening column provides smooth transitions between assist levels by restricting sudden piston movements and assuring substantially smooth operation of the piston 30. The overall spring tension 40 is adjustable via the threaded adjusting screw 41 (see FIGS. 2A-2C and 3). A pin 43 is provided to retain the piston 30 within its cylinder 29 and always below the first set of flow orifices 32.

Bypass control orifice 44 is provided downstream of the flow orifices 32 and outlet orifice 38 and communicates with the shuttle valve 16 via first bypass passage 46 (see FIGS. 2A-2C and 3). The resulting fluid pressure which is substantially directly proportional to the flow provided to the steering gear, is directed to one side of spool 50 provided within shuttle valve 16. This fluid pressure plus the force exerted by biasing spring 52 tends to drive the spool 50 in a downward direction. The tension in the spring may be suitably adjusted by the screw cap 54. This downward travel is resisted by the pressure exerted on spool 50 by the flow of excess bypass fluid along second bypass passage 48 entering the bottom of the shuttle valve 16.

During vehicle operation, and as control pressure increase at the steering gear 20 and thus at the top of the flow control valve 14, the pressure at control orifice 44 and the first bypass passage 46 correspondingly increases. At these higher pressures, the valve 14 provides a greater flow of fluid to the gear 20 and, the flow of excess fluid along the second bypass passage 48 correspondingly decreases. The result is an unbalanced force on the upper end of spool 50 and accordingly, the spool 50 travels downwardly in its cylinder 51. This new downward displacement of spool 50 serves to restrict the opening to the bypass passage 56 and thereby reduces the overall flow of bypass fluid to the bypass line 26 and ultimately to the fluid reservoir 24. This intermediate spool position is best illustrated in FIG. 2B where it can be seen that the outlet to passage 56 is partially restricted.

In FIGS. 2C and 4B all three sets of flow orifices are uncovered, providing maximum flow to the outlet orifice 38 and thus to the gear 20. In the preferred embodiment, this flow is 6 gallons per minute. Under this condition, the operating pressure to the steering gear 20 can be maintained at its maximum. Leakage past the piston of the gear and through other passages which is normal is easily compensated by the additional flow and the hydraulic pressure is allowed to build to a maximum. Correspondingly, the pressure at control orifice 44 is at its highest. Spool 50 is now biased to its downward end of travel cutting off all bypass flow (see FIG. 2C).

Advantageously, the flow control valve 14 and shuttle valve 16 work in concert to divide the flow of hydraulic fluid between the steering gear 20 and the fluid reservoir 24 as should now be realized. When steering gear pressures are low, the flow control valve 14 transmits a low pressure signal to shuttle valve 16 via control orifice 44. Spool 50 then travels upward permitting maximum bypass flow. As steering gear pressures increase, the pressure signal transmitted to shuttle valve 16 increases, and the spool 50 correspondingly travels downward thereby reducing bypass flow. When steering gear pressures are at maximum, the flow control valve 14 pressure also is at maximum, driving the spool 50 downward to the end of its travel. This cuts off all flow of bypass fluid.

In summary, numerous benefits result from employing the concepts of the present invention. The automatic regulator valve assembly 10 provides a variable flow of hydraulic fluid to steering gear 20 in response to the inlet fluid pressure of the gear itself. At high speeds/low steering inputs steering gear control valve 60 inlet pressures are low. Accordingly, the regulator valve assembly 10 provides a relatively low flow of fluid. As vehicle speeds decrease and steering inputs increase steering gear inlet pressures correspondingly increase, and the valve assembly 10 responds by providing a greater flow of fluid. The result is optimum power assist characteristics throughout all ranges of vehicle operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration f the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A vehicle power steering system providing variable power assist characteristics comprising:
   steering gear means;
   hydraulic pump means driven at variable speed to provide pressurized hydraulic fluid to said steering gear means;
   a fluid reservoir to receive low pressure fluid from said steering gear means;
   a regulator valve assembly to divide the flow of hydraulic fluid between said steering gear means and said fluid reservoir, said regulator valve assembly including means for varying the flow of hydraulic fluid to said steering gear to provide relatively reduced flow at increased pump speed substantially in full response to inlet fluid pressure of said steering gear means for optimum road feel; and
   means for bypassing excess fluid from said flow varying means around said steering gear.

2. An automatic regulator valve assembly providing a variable flow of pressurized hydraulic fluid from a variable speed hydraulic pump to a power steering gear and a reservoir comprising:
   varying means to provide said variable flow of hydraulic fluid to said steering gear to provide relatively reduced flow at increased pump speed substantially in full response to inlet fluid pressure of said gear for optimum road feel; and
   means for bypassing excess fluid from said pump around said steering gear.

3. A vehicle power steering system providing variable power assist characteristics comprising:
   steering gear means;
   hydraulic pump means to provide pressurized hydraulic fluid to said steering means;
   a fluid reservoir to receive low pressure fluid from said steering gear means;
   a regulator valve assembly to divide the flow of hydraulic fluid between said steering gear means and said fluid reservoir, said regulator valve assembly including means for varying the flow of hydraulic flow to said steering gear substantially in response to inlet fluid pressure of said steering gear means; and
   means for bypassing fluid from said flow varying means around said steering gear; said flow varying means including a flow control valve;
   said flow control valve including a reciprocating piston having first and second ends received within a cylinder, the first end of said piston being in fluid communication with said inlet fluid pressure, at least one flow orifice extending transversely across said cylinder, said piston being operative to open and close said orifice to regulate the flow to said steering gear.

4. The system of claim 3, wherein multiple flow orifices are provided, said flow orifices being positioned at spaced axial locations along said cylinder such that as said piston travels in a first direction in said cylinder toward the second end of said piston said flow orifices are sequentially opened and as said piston travels in a second direction toward said first end said flow orifices are sequentially closed.

5. The system of claim 4, having at least three flow orifices providing low, intermediate and high flow rates.

6. The system of claim 5 wherein said low, intermediate and high flow rates substantially 7. The system of claim 3, wherein said flow control valve includes biasing means acting upon the second end of said piston tending to close said orifice against a force exerted on the first end of said piston by the inlet fluid pressure of said steering gear.

8. The system of claim 7, wherein said biasing means is a coil spring acting against the second end of said piston.

9. The system of claim 8, wherein means are provided to adjust the tension of said spring.

10. The system of claim 8, further including means for diverting a portion of the bypass fluid to said second end of said piston including a restricted orifice for dampening the piston movement.

11. The system of claim 3, said flow control valve having an inlet, an outlet orifice and first and second bypass control passages; said first passage being in communication with the outlet orifice of said flow control valve and the inlet fluid pressure of said steering gear; said second passage being in communication with the inlet of said flow control valve and said fluid reservoir.

12. The system of claim 11, wherein said bypassing means includes a shuttle valve; said shuttle valve containing a spool having first and second ends; said first and second ends being in communication with said first and second bypass control passages respectively, whereby said spool reciprocates in response to fluid pressures to control the bypass of low pressure, fluid to said reservoir.

13. The system of claim 12 including biasing means acting upon said first end of said spool.

14. The system of claim 13, wherein said biasing means is a coil spring seated against said first end of said spool.

15. The system of claim 13, wherein means are provided to adjust the tension of said spring.

16. The system of claim 3, wherein said flow varying means includes a flow control valve, said bypassing means being separate from said control valve for independent operation.

17. The system of claim 16, wherein said flow control valve having an inlet, an outlet and first and second bypass control passages; said first passage being in communication with the outlet of said flow control valve and the inlet fluid pressure of said steering gear; said second passage being in communication with the inlet of said flow control valve and said fluid reservoir; said bypassing means including a separate shuttle valve; said shuttle valve containing a spool having first and second ends; said first and second ends being in communication with said first and second bypass control passages respectively, whereby said spool reciprocates in response to fluid pressures to control the bypass of low pressure fluid to said reservoir.

18. An automatic regulator valve assembly providing a variable flow of pressurized hydraulic fluid from a variable speed hydraulic pump to a power steering gear and a reservoir comprising:
   varying means to provide said variable flow of hydraulic fluid to said steering gear in response to inlet fluid pressure of said gear; and means for bypassing excess fluid from said pump around said steering gear;

said flow varying means including a flow control valve;

said flow control valve including a reciprocating piston having first and second ends received within a cylinder, the first end of said piston being in fluid communication with said inlet fluid pressure, at least one flow orifice extending transversely across said cylinder, said piston being operative to open and close said orifice to regulate the flow to said steering gear.

19. The valve assembly of claim 18, wherein multiple flow orifices are provided, said flow orifices being positioned at spaced axial location along said cylinder such that as said piston travels in a first direction in said flow orifices are sequentially opened and as said piston travels in a second direction toward said first end said flow orifices are sequentially closed.

20. The valve assembly of claim 19, having at least three flow orifices providing low, intermediate and high flow rates.

21. The valve assembly of claim 20, wherein said low, intermediate and high flow rates substantially correspond to the ratio of 1, 1.5, and 2.

22. The valve assembly of claim 18, said flow control valve having an inlet, an outlet and first and second bypass control passages; said first passage being in communication with the outlet of said flow control valve and the inlet fluid pressure of said steering gear; said second passage being in communication with the inlet of said flow control valve and said fluid reservoir.

23. The valve assembly of claim 22, wherein said bypassing means includes a shuttle valve; said shuttle valve containing a spool having first and second ends; said first and second ends being in communication with said first and second bypass control passages respectively, whereby said spool reciprocates in response to fluid pressures to control the bypass of low pressure fluid to said reservoir.

* * * * *